United States Patent [19]

Kamiunten et al.

[11] Patent Number: 5,014,552
[45] Date of Patent: May 14, 1991

[54] FLOW METER

[75] Inventors: Shoji Kamiunten, Kamakura; Shigeru Aoshima, Chigasaki; Takashi Tsumura, Ebina; Kouichi Ochiai; Takashi Inaba, both of Kamakura, Japan

[73] Assignee: Yamatake-Honeywell Co., Ltd., Tokyo, Japan

[21] Appl. No.: 446,375

[22] Filed: Dec. 5, 1989

[30] Foreign Application Priority Data

Dec. 15, 1988 [JP] Japan .................................. 63-314935

[51] Int. Cl.⁵ .................................................. G01F 1/68
[52] U.S. Cl. ...................................... 73/204.21; 73/198
[58] Field of Search ................. 73/198, 204.21, 204.22

[56] References Cited

U.S. PATENT DOCUMENTS

| | | | |
|---|---|---|---|
| 3,374,673 | 3/1968 | Trageser | 73/204.21 |
| 3,645,133 | 2/1972 | Simeth et al. | 73/204.15 |
| 4,224,826 | 9/1980 | McLoughlin et al. | 73/198 |
| 4,280,360 | 7/1981 | Kobayashi et al. | 73/198 |
| 4,412,449 | 11/1983 | Eiermann et al. | 73/204.21 |
| 4,448,070 | 5/1984 | Ohyama et al. | 73/204.21 |

Primary Examiner—Herbert Goldstein
Attorney, Agent, or Firm—Whitham & Marhoefer

[57] ABSTRACT

A flow sensor comprising a flow passage, a rectifying element such as a plurality of screens or a honeycomb structure or both, arranged in the flow passage, a flow passage reducer for reducing the flow passage behind the rectifying element, and a thermal flow sensor, such as for example a micro bridge sensor, mounted at a location immediately behind the reducer. The above structure can largely reduce disturbance in flow to thereby enable highly accurate measurements of a wide range of flow without a low pass filter.

6 Claims, 2 Drawing Sheets

FLOW METER

BACKGROUND OF THE INVENTION

1. Field of the Invention

This invention relates to a flow meter, and more particularly to a flow meter of this kind which is capable of eliminating flow disturbance and generating stable detected signals even with a high flow rate.

2. Description of the Prior Art

In conventional flow meters employing a microbridge sensor, the sensor is simply placed at a location on the inner wall of a flow passage in a predetermined shape such as a circular or rectanglar pipe.

The above structure, that is, placing a microbridge sensor on the inner surface of the wall of the circular or rectangular flow path, allows measurement of flow at a low rate. However, as the flow rate is increased, disturbance is produced in the flow due to the difference in the passage diameter at the upstream side, curvature of the passage, the wall surface, and so on, whereby a rapidly responding sensor such as the microbridge sensor responds to such disturbance and accordingly its output signal is correspondingly disturbed. It is therefore necessary to provide a strong low pass filter to remove noise components and measure an average flow. Also, if an available electric power is limited, the sensor has to be driven intermittently, so that a disturbed output makes the measurement quite difficult.

OBJECTS AND SUMMARY OF THE INVENTION

In view of the above problems, it is the object of the present invention to provide a flow meter which can eliminate disturbance in flow and generate stable output signals even with a high flow rate.

To achieve the above object, the present invention provides a flow meter comprising:
- a flow passage;
- rectifying means arranged in the flow passage;
- flow passage reducing means for reducing the flow passage behind the rectifying means; and
- a thermal flow sensor mounted at a location immediately behind the reducing means.

Preferably, the rectifying means is a plurality of screens spaced with each other or a honeycomb structure.

Further preferably, the flow passage has an enlarged portion in which the rectifying means is arranged.

The above and other objects and features of the present invention will become apparent from the following detailed description of the preferred embodiments with reference to the accompanying drawings.

DETAILED DESCRIPTION OF THE PREFERRED EMBODIMENTS

Figure 1:
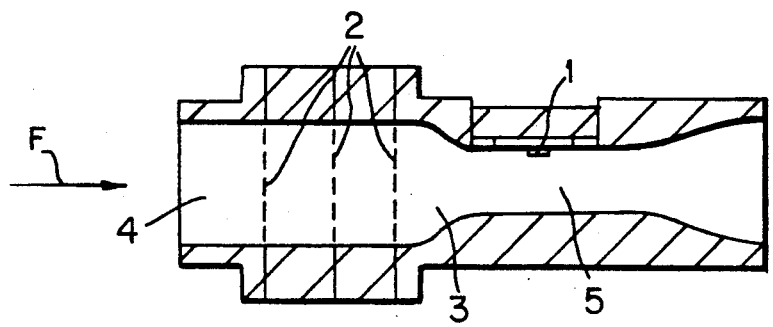
FIGS. 1 through 3 are cross-sectional views respectively showing first, second and third embodiments of flow meters according to the present invention.

FIG. 1 shows a cross-sectional view of a first embodiment of a flow meter according to the present invention. The flow meter of FIG. 1 includes a microbridge sensor 1, a screen 2, a reducer 3 for reducing the flow passage, a flow passage 4 of a 20-mm circular pipe and a flow passage 5 of a 10-mm circular pipe. The circular flow passage 4 is provided with a rectifying element formed, for example, of three sheets of 30-mesh screens inserted therein. A back portion of the flow passage 4 is reduced, as shown by the reducer 3, to be connected to the 10-mm flow passage 5. The microbridge sensor 1 is mounted at a location on the inner surface of the flow passage 5. In the present embodiment, the diameter of the flow passage 5 in which the microbridge sensor is mounted is chosen to be 10 mm however, the passage diameter generally depends upon the measuring range. Specifically, a small diameter passage is suitable for measuring a small amount of flow since the flow rate is high in such narrow passage and the output signal level is also high. However, a large amount of flow in this same narrow passage causes the output from the microbridge sensor 1 to be saturated and a pressure loss to be increased. Therefore, a larger diameter of flow passage is required to measure up to a large amount of flow. The reducer 3 is useful in suppressing disturbance in flow and making the flow distribution even, thereby increasing the flow rate in the vicinity of the location on which the microbridge sensor 1 is mounted, with the result that the output signal level is also extended.

Figure 2:
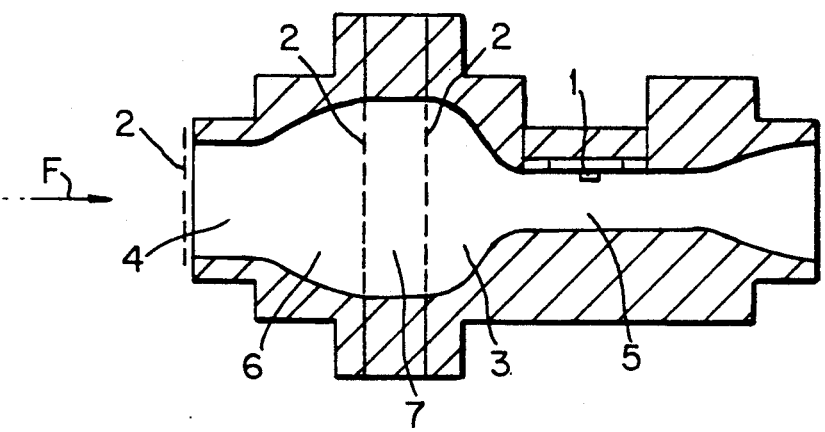

FIG. 2 shows a cross-sectional view of a second embodiment of the present invention. The parts corresponding to those in FIG. 1 are designated the same reference numerals and the explanation thereof will be omitted.

In the second embodiment, a sheet of 30-mesh screen is arranged at the entrance of the 20-mm flow passage 4. The diameter of the passage is enlarged by a diffuser 6, for example, to 34 mm to form an enlarged passage 7. Then two sheets of 30-mesh screens are inserted in the enlarged passage 7. Also, a back portion of the enlarged passage 7 is reduced by the reducer 3 to be connected to the 10-mm circular flow passage 5 in which the microbridge sensor 1 is mounted. The enlarged passage 7 is provided for decreasing the flow rate and improving a rectifying effect. It is experimentally found that a shorter diffuser 6 (in the flow direction) shows a better characteristic. It is important to arrange the screens 2 immediately behind the diffuser 6.

Figure 3:
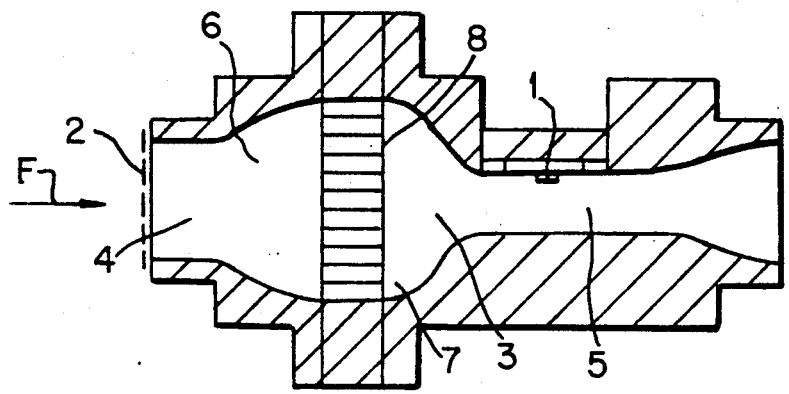

FIG. 3 shows an example which has a bundle of capillaries, as a rectifying element, in place of the screens 2. It is better to select smaller diameter capirallies rather than long capillaries to effectively decrease the disturbance. Also, the capillary thickness should be sufficiently thin.

The mounted position of the microbridge sensor 1 in FIGS. 1-3, is preferably as close as possible to the reducer 3. This is because the disturbance is developed larger at a position further away from the reducer 3. Also preferably, the inner peripheral shape of the reducer 3 is a cosine curve.

Figure 4:
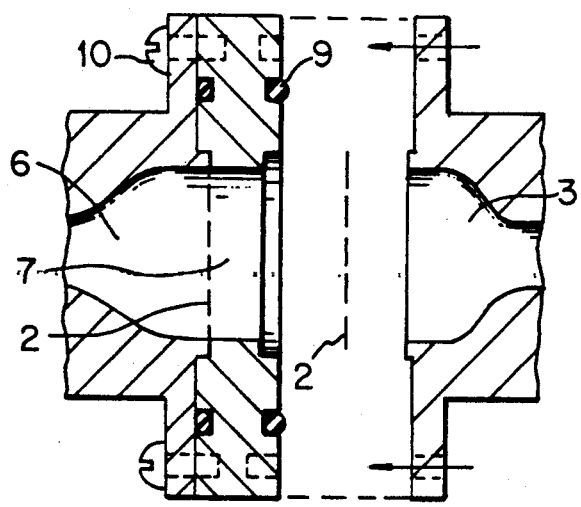
FIGS. 4 and 5 are cross-sectional views used for explaining how screens are arranged.
Figure 5:
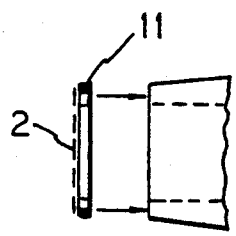

FIGS. 4 and 5 are cross-sectional views showing how to arrange the screens 2 in the flow passage. More specifically, FIG. 4 shows that two sheets of the screens 2 are respectively inserted into grooves 12, 13 formed on the inner surface of the enlarged passage 7. The enlarged passage 7 is provided with O-rings 9 and screws 10 for a fluid tight structure. FIG. 5 shows that one of the screens 2 is attached to the entrance of the flow passage 4 by means of a screen attachment ring 11.

Figure 6:
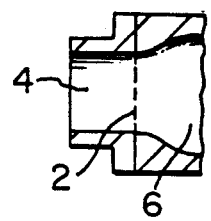
FIG. 6 is a cross-sectional view used for explaining how a screen is attached to the entrance of a pipe.
Figure 7:
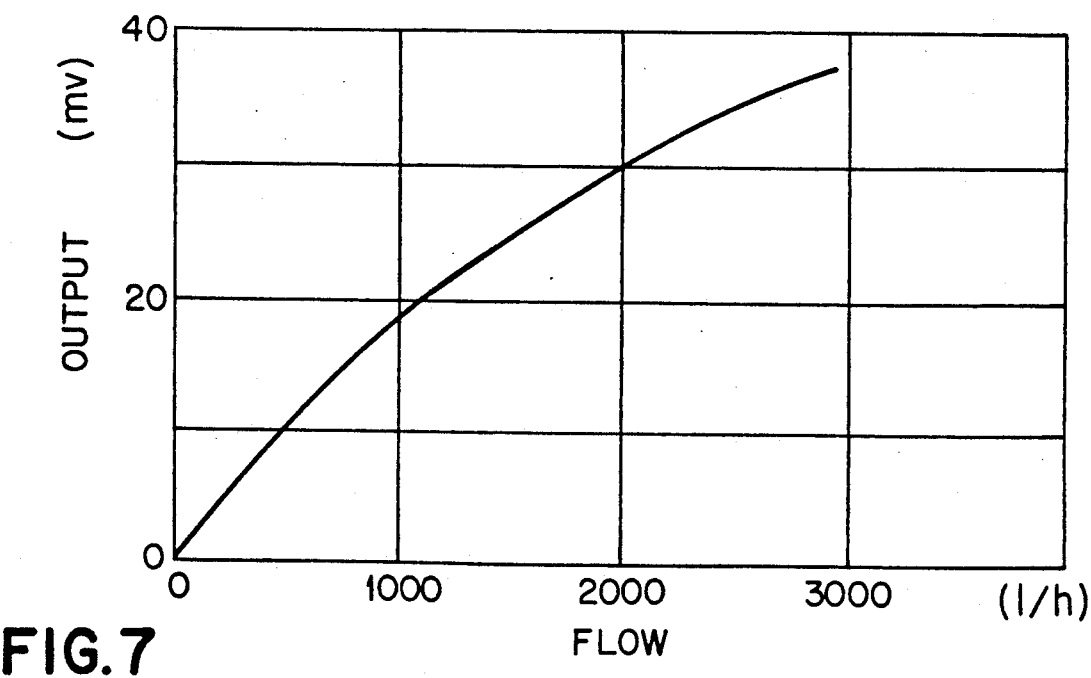
FIG. 7 is a graph showing the relationship between the flow and output voltage of the embodiments shown in FIGS. 1-3.

Preferably, the screen 2 attached to the entrance of the flow passage, as shown in FIGS. 2 and 3, is disposed at a location slightly downstream, for example, at the boundary between the circular flow passage 4 and the diffuser 6, as illustrated in FIG. 6. FIG. 7 shows a typical output characteristic of the flow meters shown in FIGS. 1–3, wherein the abscissa represents the flow amount and the ordinate the output voltage.

In each of the above embodiments, a circular pipe is employed for the flow passage. Alternatively, a rectangular pipe may be employed. However, the rectangular pipe causes vortex or disturbance to be produced at its corners, so that the circular pipe shows better characteristics.

As described above, the flow meter according to the present invention is provided with a rectifying element, such as a plurality of screens suitably spaced with each other and a honeycomb structure, a reducer for reducing the flow passage behind the rectifying element, and a microbridge sensor disposed immediately behind the reducer, whereby disturbance in flow is suppressed and accordingly the flow is quite stable. It is therefore possible to highly accurately measure a wide range of flow, from small to large quantities, even without a low pass filter, or in an intermittently driving condition.

Incidentally, as the rectifying element, three sheets of screens with relatively large meshes, for example 30-mesh per inch, are preferably employed to reduce a pressure loss.

It will be understood that those skilled in the art may make changes and modifications to the foregoing flow meter without departing from the spirit and scope of the invention as set forth in the claims appended hereto.

What is claimed is:

1. A flow sensor comprising:
   a flow passage having an inlet, an enlarged portion relative to said inlet and a narrow portion relative to said inlet;
   rectifying means arranged in said enlarged portion of said flow passage;
   a flow passage reducing means for reducing the flow passage behind said rectifying means; and
   a thermal flow sensor mounted on the inner wall of said narrow portion of said flow passage at a location immediately behind said reducing means.

2. A flow sensor according to claim 1, wherein said rectifying means is a plurality of plane screens laterally spaced with each other.

3. A flow sensor according to claim 1, wherein said rectifying means is a honeycomb structure.

4. A flow sensor as in claim 1 wherein said flow passage reducing means gradually reduces the passage as it transitions from said enlarged passage portion to said narrow passage portion.

5. A flow sensor as in claim 4 wherein said passage reducing means follows a cosine function.

6. A flow sensor as in claim 4 wherein said flow sensor is a microbridge flow sensor.

* * * * *